US005098453A

United States Patent [19]

Turner et al.

[11] Patent Number: 5,098,453

[45] Date of Patent: Mar. 24, 1992

[54] VAPOR STORAGE CANISTER WITH VOLUME CHANGE COMPENSATOR

[75] Inventors: Kenneth W. Turner, Webster; Patti S. Du Bois, Hamlin; Brian J. Dunham, Rochester, all of N.Y.

[73] Assignee: General Motors Corporation, Detroit, Mich.

[21] Appl. No.: 694,600

[22] Filed: May 2, 1991

[51] Int. Cl.[5] ........ B01D 53/02

[52] U.S. Cl. ........ 55/387; 55/507; 55/509; 220/93; 123/519

[58] Field of Search ........ 55/387, 316, 507, 509; 248/624; 220/85 B, 93; 123/579

[56] References Cited

U.S. PATENT DOCUMENTS 4,496,379 1/1985 Kozawa ........ 55/387
4,766,872 8/1988 Kato et al. ........ 123/519

*Primary Examiner*—Bernard Nozick
*Attorney, Agent, or Firm*—Patrick M. Griffin

[57] ABSTRACT

A bed of activated carbon granules is maintained tightly packed within a fuel vapor storage canister housing by a specially designed compensator. A pair of spring loaded, nested trays move axially relative to one another and push continually into the lower face of the carbon bed to keep it packed. The trays also define a continuous, self maintaining gap that is smaller than the expected carbon granule size, preventing them from falling out in spite of the swelling of the canister housing.

2 Claims, 2 Drawing Sheets

VAPOR STORAGE CANISTER WITH VOLUME CHANGE COMPENSATOR

This invention relates to vehicle fuel vapor storage canisters in general, and specifically to such a canister with an improved means for compensating for volume expansion caused by environmental factors.

BACKGROUND OF THE INVENTION

Fuel vapor storage canisters are by now a standard feature of production automobiles in the United States. The basic design includes an elongated canister housing with closed ends that is substantially filled with a bed of packed fuel adsorbent granules, typically activated carbon. Nylon is a material choice for the canister housing, because of its durability and light weight. However, nylon and similar materials are subject to expansion both from water absorption and heat. Canisters are typically mounted underhood, an environment that is highly subject both to high heat and water splash. The carbon bed is usually retained in the canister housing by at least one plug or end plate that is pressed into the end face of the carbon bed to keep it tightly packed. The end plate is sized based on the nominal size of the perimeter of the inner surface of the canister housing.

Under the hood, environmentally induced expansion or swelling of the canister housing can potentially cause two problems. One is that the carbon bed becomes loose, since it does not expand in volume correspondingly. This can be compensated by making the end plate movable, and biasing it continually into the face of the carbon bed so that it remains tightly packed. A more serious problem is that canister housing expansion can create a significant increase in the perimeter of the inner surface, causing it to pull away from the edge of the end plate. Granules of the carbon bed can fall through, reducing the canister efficiency and capacity, and potentially interfering with the compression spring.

SUMMARY OF THE INVENTION

The invention provides an improved canister housing volume change compensator that maintains the packing of the carbon bed, but which preventS the loss of carbon granules.

In the preferred embodiment disclosed, an elongated nylon canister housing of generally rectangular cross section is molded of nylon, with two closed ends. The perimeter of the inner surface of the canister housing can increase from its nominal, time of manufacture size, due to the kind of environmental expansion described above. A fuel vapor adsorbent bed of packed activated charcoal granules, which have a predetermined granule size, is retained by a lower foam screen that defines an end face of the carbon bed. To maintain the bed tightly packed, a special floating volume compensator is located between the foam screen and the bottom end cover of the canister housing.

The volume compensator includes a pair of upper and lower trays that are biased continually apart by a pair of coil springs. The lower tray sits on the end cover, while the upper tray is continually biased into the foam screen. The lower tray has an upstanding coaming with a perimeter substantially equal to the nominal perimeter of the canister housing, while the upper tray has a depending peripheral flange that is nested inside the coaming with a continuous gap therebetween. The gap is deliberately made smaller than the carbon bed granular size. Even if the housing expands, that gap maintains itself, and the granules are prevented from falling out of the bed and between the trays.

It is, therefore, a general object of the invention to maintain the carbon bed of a vapor canister tightly packed, while preventing fallout of the carbon granules when the canister housing swells.

It is another object of the invention to provide an improved canister with a special floating volume compensator that resiliently biases the carbon bed to maintain it tightly packed, but which maintains a gap between the moving parts small enough to prevent loss of the carbon granules.

It is another object of the invention to provide a floating volume compensator that has a pair of nested trays that can be pre-assembled together to form a subassembly before the canister is built up.

SUMMARY OF THE INVENTION

These and other objects and features of the invention will appear from the following written description, and from the drawings, in which.

Figure 1:
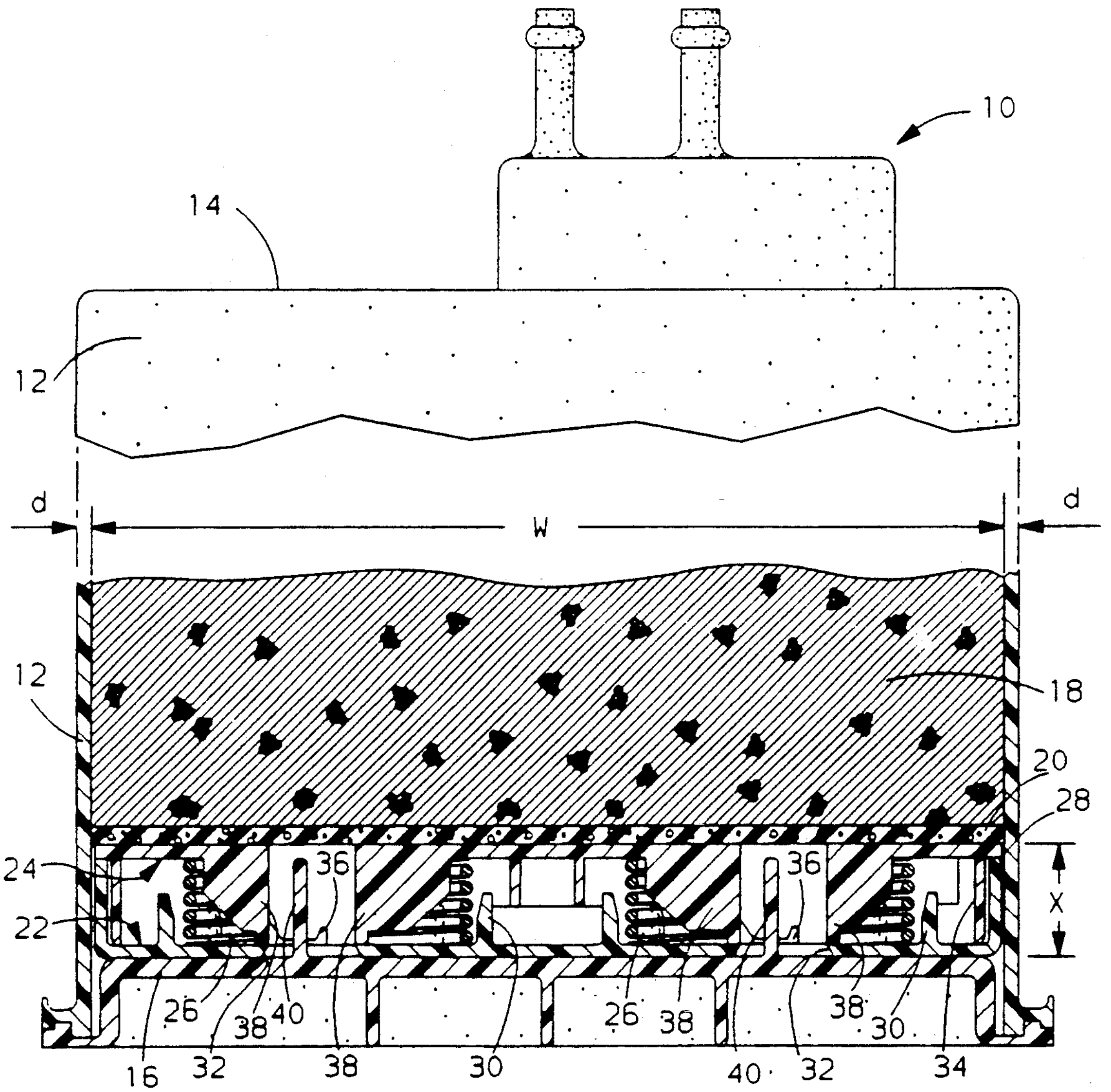
FIG. 1 is a cross sectional view of the lower portion of a canister embodying a preferred embodiment of the invention, with the top of the housing shown in elevation, and showing the nominal volume of the canister housing.

Referring first to FIG. 1, a canister embodying the invention is indicated generally at 10. Canister 10 includes an elongated nylon housing 12 of generally rectangular cross section, with a closed upper end 14 that is molded integrally with housing 12, and an axially opposed bottom end comprised of a bottom cover 16. The most significant dimension of housing 12 in terms of the invention is its perimeter as measured in a cross section perpendicular to its axis, shown by the central dotted line. Specifically the perimeter of its inner surface is important, a function of its width W and its thickness measured perpendicular to its width. When exposed to water, the nylon material of housing 12 will expand significantly, increasing its width as shown by a differential d. The thickness will grow as well, as does the whole perimeter. Temperature increase can cause a similar, if lesser, expansion. A fuel vapor adsorbent bed of carbon granules 18 is packed inside housing 12, sandwiched in place between closed upper end 14 and a foam screen 20. Screen 20 creates a bottom end face of bed 18 that has a nominal axial spacing X from bottom cover 16. Screen 20, in turn, is supported by structure described below. For efficient, rattle free operation of canister 10, it is important that the carbon granules 18 be kept fairly tightly packed, in intimate contact with the inner surface of housing 12. Clearly, as housing 12 swells and expands, that condition can be jeopardized.

Figure 4:
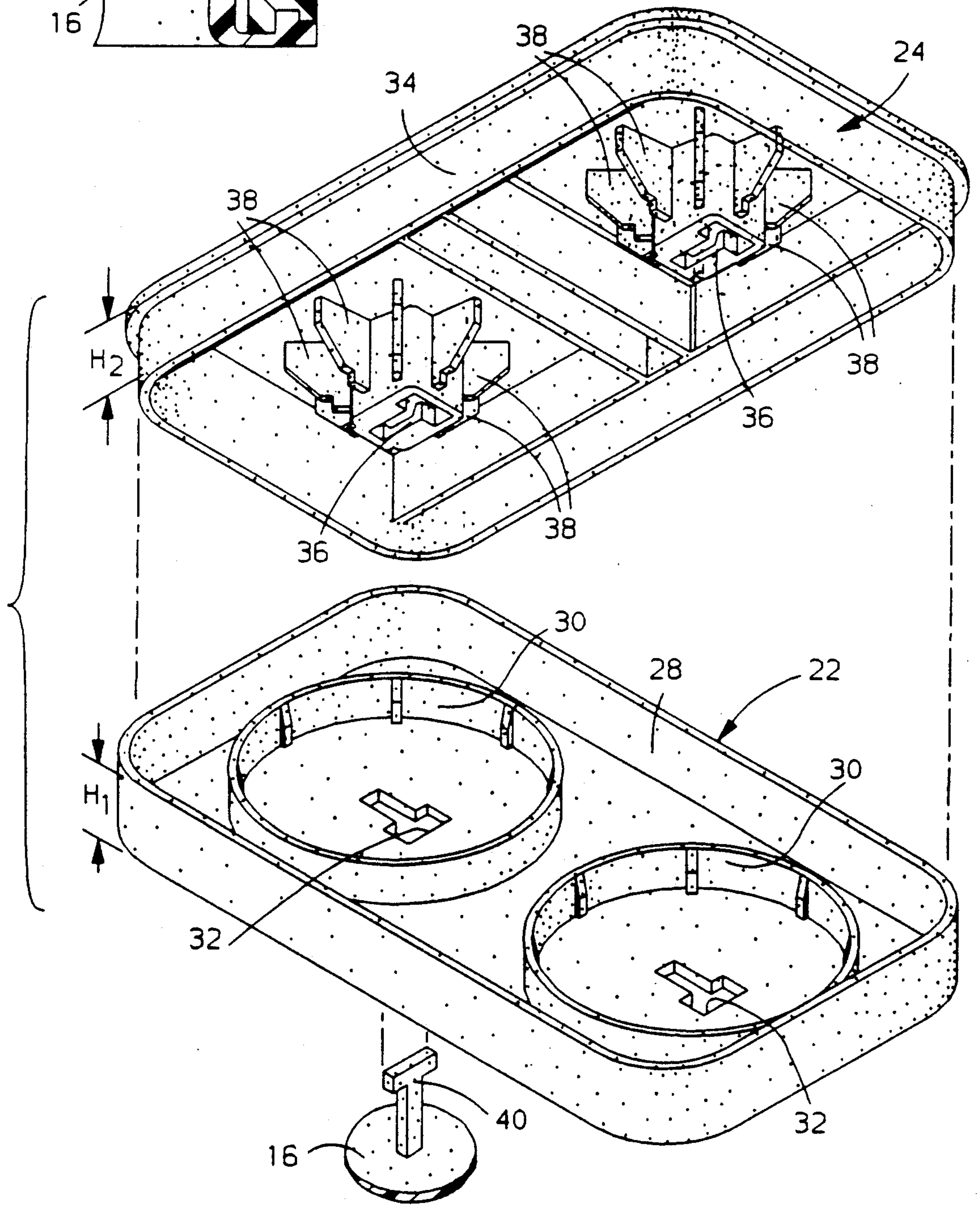
FIG. 4 is a perspective of the basic components of the volume compensator.

Referring next to FIGS. 1 and 4, carbon bed 18 is kept packed by a special floating volume compensator that includes a lower tray, indicated generally at 22, and an upper tray, indicated generally at 24, biased apart by a pair of compression coil springs 26. Lower tray 22 is integrally molded of a plastic material, preferably a material more stable then canister housing 12. Tray 22 has an axially directed, continuous coaming 28 that has a perimeter just slightly smaller than the nominal perimeter of housing 12, and an axial height $H_1$ that is just less than X. A pair of cylindrical spring supports 30 sized to fit around the springs 26 surround a pair of T slots 32. Upper tray 24, also integrally molded of the same material, has an axially directed, depending peripheral flange 34 with an axial height $H_2$ close to $H_1$ and a perimeter that is slightly less than coaming 28. Therefore, flange 34 can be nested within coaming 28, creating a lateral gap g, that is, a gap perpendicular to the axis of canister housing 12, that runs continuously all the way around the inside perimeter of housing 12. The relative perimeter of flange 34 is chosen so that g is less than the expected size of the individual carbon granules of bed 18. Upper tray 24 also has a pair of T slots 36 that match T slots 32 in shape and location surrounded by an array of radiating fins 38 sized to fit inside the springs 26. The pairs of matched T slots 32 and 36 are axially aligned with each other and with a pair of upstanding T shaped stems on bottom cover 16, for a purpose described next.

Figure 2:
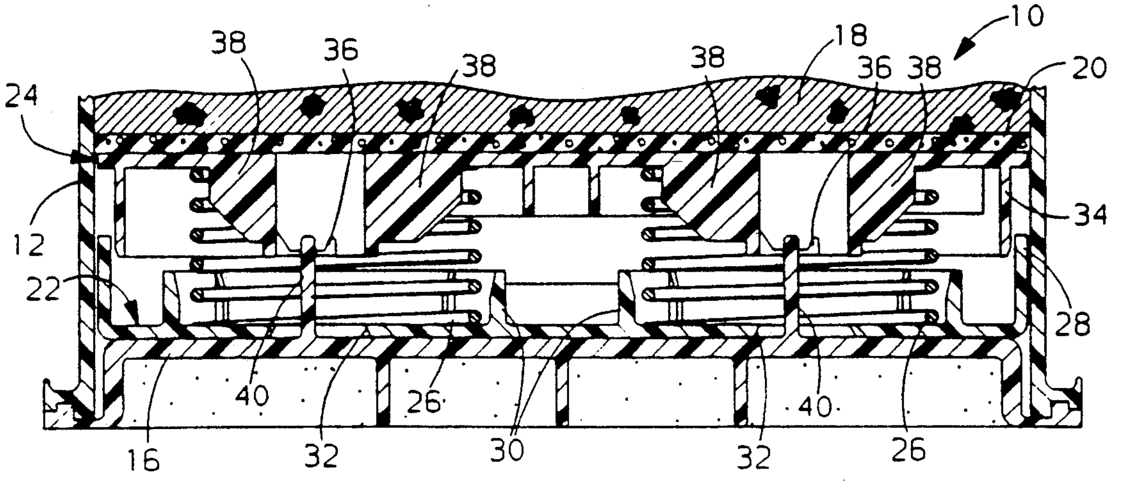
FIG. 2 is a cross sectional view of just the bottom portion of the canister, showing its expanded condition.
Figure 3:
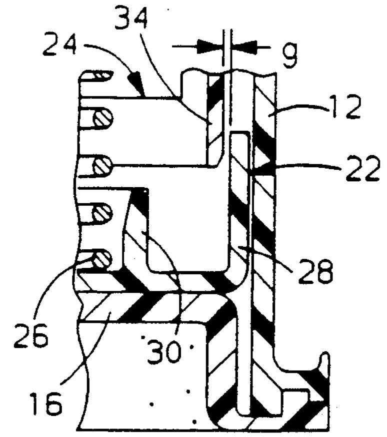
FIG. 3 is an enlarged area of FIG. 3.

Referring next to FIGS. 1 and 4, the structures described above cooperate to allow canister 10 to be easily assembled. To build up canister 10, canister housing 12 is supported upside down and the carbon bed 18 poured in place. Foam screen 20 is then added, which leaves an empty volume of axial height X, described above. Next, bottom cover 16 and the two trays 22 and 24 are put together as a subassembly. This is accomplished by first setting lower tray 22 onto bottom cover 16, passing the stems 40 axially through the wide end of the T slots 32 and then sliding tray 22 laterally so that the stems 40 lock into the narrow part of the T slots 32. Then, the springs 26 are set into the supports 30, and upper tray 24 is edded by pressing it axially toward lower tray 22. The fin arrays 38 are pushed inside the supported springs 26, which compress until the stems 40 pass axially through the wide portion of the T slots 36. Then, upper tray 24 is moved laterally, hooking the stems 40 into the narrow portion of the T slots 36, and locking all the pieces together as a convenient, rattle free subassembly. Finally, the subassembly is installed by pushing it axially into the open end of canister housing 12, pressing upper tray 24 into foam screen 20 and compressing springs 26 until bottom cover 16 seats on the edge of the open end of canister housing 12. Bottom cover 16 is then glued or welded in place. The exclusionary gap g is thus located axially between the end face of the bed 18 and the bottom cover 16, Referring next to FIGS. 1, 2 and 3, the operation of canister 10 is illustrated. When canister housing 12 expands, springs 26 expand from the FIG. 1 to the FIG. 2 position. Because both the coaming 28 and flange 34 are axially disposed and do not touch, they can move axially freely past one another, allowing the upper tray 24 to move axially up into the end face of the bed 18 under the force of springs 26. This maintains the carbon granules firmly packed and in intimate contact with the inner surface of housing 12. The inner surface of the housing 12 may enlarge enough to part from the edge of screen 20, allowing individual grains of bed 18 past. However, the gap g between the shorter and stiffer coaming 28 and flange 34 will maintain itself. Therefore, granules of carbon will be prevented from falling into the relatively large volume between the trays 22 and 24, which could reduce the efficiency of canister 10 and interfere with the operation of the springs 26. If the inner surface of housing 12 moves away from coaming 28, carbon granules may fall between, but this will not present a problem, as there is very little volume there to fill. $H_1$ and $H_2$ are sufficient to continually maintain an axial overlap between flange 34 and coaming 28, and thus maintain the exclusionary gap 9, throughout the expected volume increase of housing 12 and attendant rise of upper tray 24. The gap g acts like a labyrinth seal, in that there is no rubbing between the coaming 28 and the flange 34, but particulates are still effectively excluded.

Variations in the disclosed embodiment could be made. Most fundamentally, a floating volume compensator could be comprised of any two members that had a pair of surfaces that were disposed generally parallel to the axis of the canister and which ran continuously around the perimeter of the inner surface of the canister. When such surfaces are nested or axially overlapped one within the other, they can move axially freely past one another under the force of the springs, keeping the carbon packed while maintaining the gap that prevents carbon fall out. Some means other than the stems 40 and the aligned T slots 32 and 36 could be used to retain the trays 22 and 24 together as a subassembly, even apart from the bottom cover 16, so long as enough free axial motion was available to let the springs 26 compress and expand as needed. It is particularly convenient if the bottom cover 16 is included in the subassembly, however. The total subassembly is also an advantage in that it would allow similar subassemblies of any shape and thickness to be installed later. Therefore, it will be understood that it is not intended to limit the invention to just the embodiment disclosed.

The embodiments of the invention in which an exclusive property or privilege is claimed are defined as follows:

1. In a vehicle fuel vapor storage canister that has a central axis and axially opposed closed ends and an inner surface the perimeter of which is subject to expansion beyond its nominal value due to environmental conditions, and in which a bed of fuel vapor adsorbent granules of predetermined size is packed in intimate contact with said canister inner surface and has an end face respective to one of said canister closed ends, a floating volume compensator, comprising, a first member abutted with said one canister closed end including a first axially extending surface running continuously around said canister inner surface perimeter, a second member abutted with said bed end face and including a second axially extending surface with a perimeter slightly smaller than said first axially extending surface and axially overlapped therewith so as to create a continuous gap located between said adsorbent bed end face and one canister closed end that is smaller than said predetermined granule size, and, a compression spring means biasing said first and second members axially apart, whereby, when said canister housing expands, said first and second surfaces can move axially freely past one another to allow said first member to move axially into said end face and maintain said adsorbent bed in intimate contact with said canister housing inner surface while maintaining said gap to prevent said granules from falling out of said adsorbent bed.

2. In a vehicle fuel vapor storage canister that has an elongated canister housing with closed ends and formed of a material the inner surface of which has a perimeter that is subject to expansion beyond its nominal value due to environmental conditions, and in which a bed of fuel vapor adsorbent granules of predetermined size is packed in intimate contact with said canister inner surface and has an end face respective to one of said canister closed ends, a floating volume compensator, comprising, a lower tray abutted with said one canister closed end and having an upstanding coaming wall conforming to said canister housing inner surface, an upper tray abutted with said adsorbent bed end face and having a depending, continuous peripheral flange nested inside of said coaming wall so as to create a continuous gap therebetween smaller than said predetermined granule size, and a compression spring means biasing said trays apart, whereby said base plate is maintained tight against said adsorbent bed lower face to maintain said granules tightly packed, while said gap retains said granules against fall out regardless of the expansion of said canister housing.

* * * * *